US010009930B2

(12) United States Patent
Kim et al.

(10) Patent No.: US 10,009,930 B2
(45) Date of Patent: Jun. 26, 2018

(54) METHOD AND APPARATUS FOR TRANSMITTING FRAME

(71) Applicant: LG ELECTRONICS INC., Seoul (KR)

(72) Inventors: Suhwook Kim, Seoul (KR); Kiseon Ryu, Seoul (KR); Jeongki Kim, Seoul (KR); Giwon Park, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days. days.

(21) Appl. No.: 15/319,492

(22) PCT Filed: Jan. 9, 2015

(86) PCT No.: PCT/KR2015/000217
§ 371 (c)(1),
(2) Date: Dec. 16, 2016

(87) PCT Pub. No.: WO2015/194727
PCT Pub. Date: Dec. 23, 2015

(65) Prior Publication Data
US 2017/0325266 A1 Nov. 9, 2017

Related U.S. Application Data

(60) Provisional application No. 62/014,121, filed on Jun. 19, 2014, provisional application No. 62/023,173, filed on Jul. 10, 2014.

(51) Int. Cl.
H04W 74/08 (2009.01)
H04W 72/04 (2009.01)
H04W 84/12 (2009.01)

(52) U.S. Cl.
CPC ... *H04W 74/0833* (2013.01); *H04W 72/0413* (2013.01); *H04W 72/0446* (2013.01); *H04W 84/12* (2013.01)

(58) Field of Classification Search
CPC .................. H04W 74/0833–74/0858; H04W 72/0413–72/042; H04W 72/0446; H04W 84/12; H04B 7/024
See application file for complete search history.

(56) References Cited

U.S. PATENT DOCUMENTS

2011/0150004 A1* 6/2011 Denteneer ............. H04L 5/0023
370/476
2012/0106371 A1 5/2012 Abraham et al.
(Continued)

FOREIGN PATENT DOCUMENTS

WO WO 2013/058512 A1 4/2013
WO WO 2013/141672 A1 9/2013
WO WO 2013/165582 A1 11/2013

*Primary Examiner* — Eric Myers
(74) *Attorney, Agent, or Firm* — Birch, Stewart, Kolasch & Birch, LLP

(57) ABSTRACT

Disclosed are a method and apparatus for transmitting a frame. A method for transmitting a frame in a wireless LAN comprises the steps of: an STA receiving an uplink transmission trigger frame from an access point (AP), wherein the uplink transmission trigger frame triggers the transmission of an uplink frame of an STA on an overlapping time resource, and triggers the transmission of one other uplink frame of at least one other STA; the STA transmitting the uplink frame to the access point (AP) through an allocated uplink transmission resource; and the STA performing a backoff process based on channel access parameters, which have been determined according to the success of the uplink frame transmission.

10 Claims, 11 Drawing Sheets (A)

(B)

(56) References Cited

U.S. PATENT DOCUMENTS

| | | |
|---|---|---|
| 2013/0145224 A1 | 6/2013 | Kim et al. |
| 2014/0301383 A1 | 10/2014 | Sohn et al. |
| 2015/0063128 A1* | 3/2015 | Garikipati ............ H04B 7/0417 370/252 |
| 2015/0085836 A1 | 3/2015 | Kang et al. |

* cited by examiner

FIG. 1
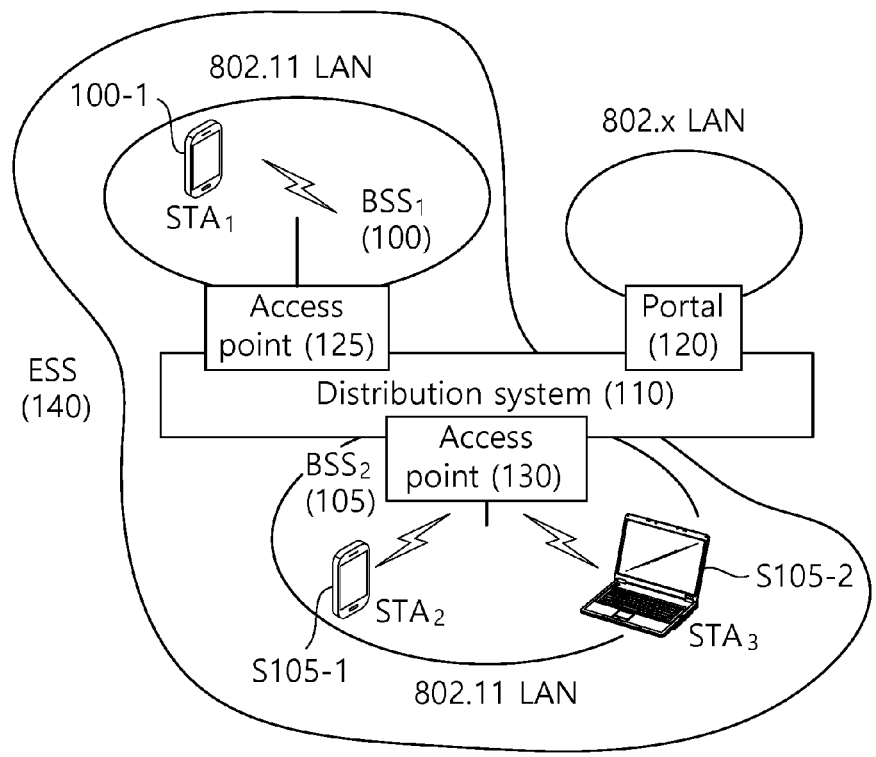
(A)
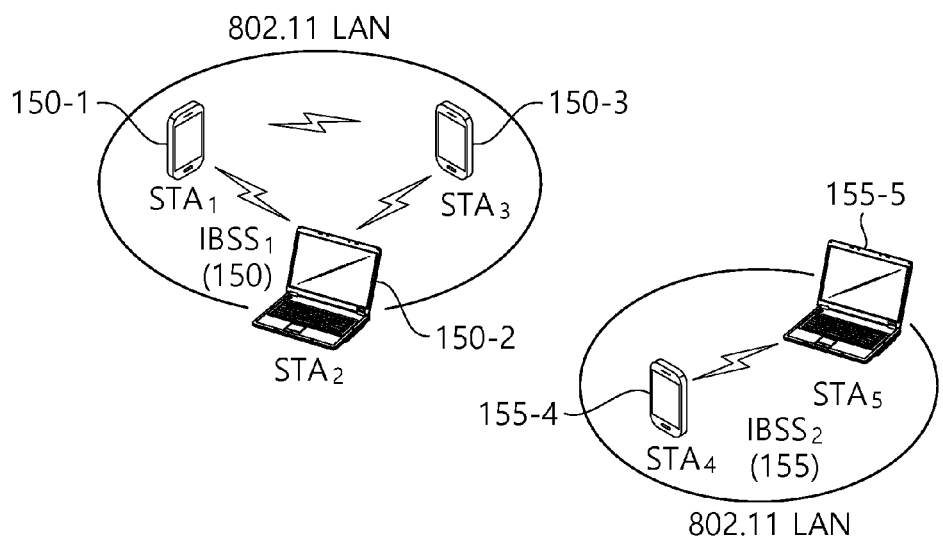
(B)

METHOD AND APPARATUS FOR TRANSMITTING FRAME

CROSS REFERENCE TO RELATED APPLICATIONS

This application is the National Phase of PCT International Application No. PCT/KR2015/000217, filed on Jan. 9, 2015, which claims priority under 35 U.S.C. 119(e) to U.S. Provisional Application No. 62/014,121, filed on Jun. 19, 2014 and 62/023,173 filed on Jul. 10, 2014, all of which are hereby expressly incorporated by reference into the present application.

BACKGROUND OF THE INVENTION

Field of the Invention

The present invention relates to wireless communication and, most particularly, to a method and apparatus for transmitting a frame.

Related Art

In a wireless local area network (WLAN) system, distributed coordination function (DCF) may be employed as a method enabling a plurality of stations (STAs) to share a wireless medium. DCF is based on a carrier sensing multiple access with collision avoidance (CSMA/CA).

Generally, in operations under a DCF access environment, when a medium is not occupied (that is, idle) for a DCF interframe space (DIFS) interval or longer, an STA may transmit a medium access control (MAC) protocol data unit (MPDU) to be urgently transmitted. When the medium is determined to be occupied according to a carrier sensing mechanism, an STA may determine the size of a contention window (CW) using a random backoff algorithm and perform a backoff procedure. The STA may select a random value in the CW to perform the backoff procedure and determine backoff time based on the selected random value.

When a plurality of STAs attempts to access a medium, an STA having the shortest backoff time among the STAs is allowed to access the medium and the other STAs may suspend the remaining backoff times and wait until the STA having accessed the medium finishes transmission. When the STA having accessed the medium finishes frame transmission, the other STAs contend again with the remaining backoff times to acquire a transmission resource. As such, in the existing WLAN system, one STA occupies the entire transmission resource through one channel to transmit/receive a frame to/from an AP.

SUMMARY OF THE INVENTION

Technical Objects

An object of the present invention is to provide a method for transmitting a frame.

Another object of the present invention is to provide an apparatus for transmitting a frame.

Technical Solutions

In order to achieve the above-described technical object of the present invention, according to an aspect of the present invention, a method for transmitting a frame in a wireless LAN may include the steps of receiving by a station (STA) an uplink transmission trigger frame from an access point (AP), wherein the uplink transmission trigger frame triggers a transmission of an uplink frame of the STA and a transmission of another uplink frame of at least another STA within an overlapping time resource, transmitting by the station (STA) the uplink frame to the access point (AP) through an allocated uplink transmission resource, and performing by the STA a backoff procedure based on a channel access parameter being determined in accordance with a success or failure of a transmission of the uplink frame.

In order to achieve the above-described technical object of the present invention, according to another aspect of the present invention, a station (STA) transmitting a frame in a wireless LAN may include a radio frequency (RF) unit configured to transmit and/or receive radio signals, and a processor operatively connected to the RF unit, wherein the processor is configured to receive an uplink transmission trigger frame from an access point (AP), to transmit the uplink frame to the access point (AP) through an allocated uplink transmission resource, and to perform a backoff procedure based on a channel access parameter being determined in accordance with a success or failure of a transmission of the uplink frame, and, herein, the uplink transmission trigger frame may trigger a transmission of an uplink frame of the STA and a transmission of another uplink frame of at least another STA within an overlapping time resource.

Effects of the Invention

By having the STA (or access point (AP)) transmit an uplink frame by using a channel access parameter based on an uplink multi-user (UL MU) transmission procedure, the radio resource usage efficiency of a wireless LAN may be enhanced.

BRIEF DESCRIPTION OF THE DRAWINGS

FIG. 1 is a conceptual drawing showing the structure of a wireless local area network (WLAN).

DESCRIPTION OF EXEMPLARY EMBODIMENTS

Figure 2:
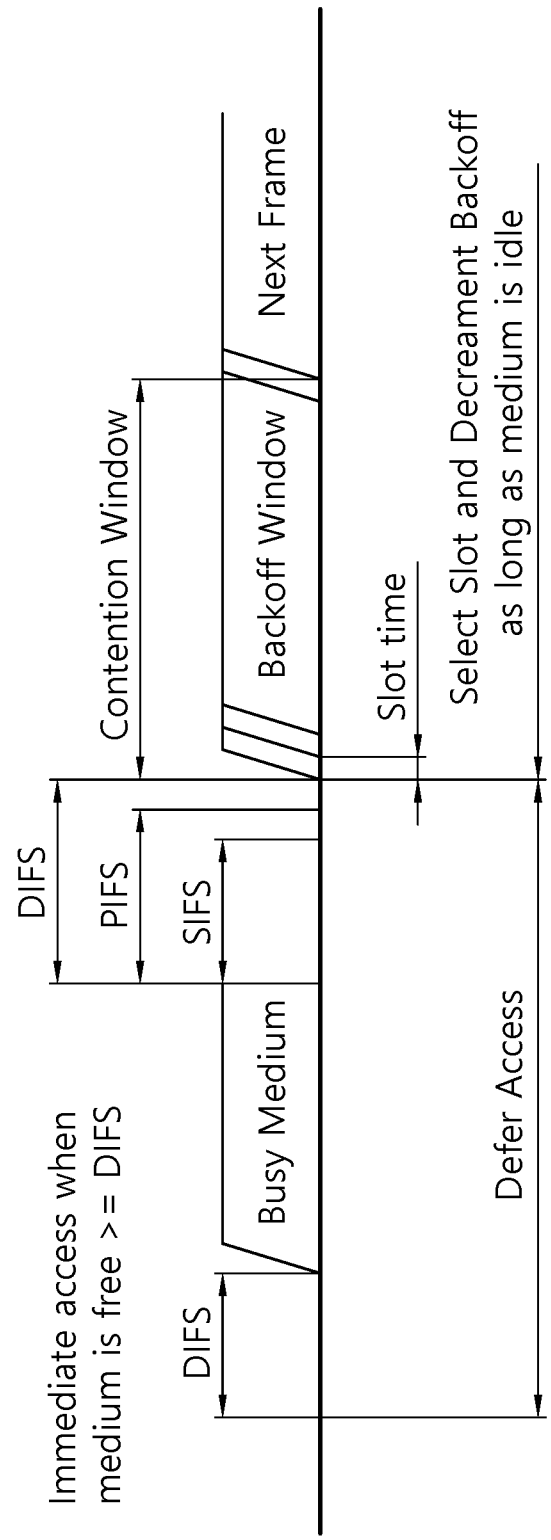
FIG. 2 is a conceptual drawing showing a channel access procedure based on DCF.

FIG. 1 is a conceptual drawing showing the structure of a wireless local area network (WLAN).

An upper portion of FIG. 1 shows the structure of the institute of electrical and electronic engineers (IEEE) 802.11 infrastructure network.

Referring to the upper portion of FIG. 1, the WLAN system may include one or more basic service sets (BSSs) 100 and 105. The BSS 100 or 105 is a set of an access point (AP) such as AP 125 and a station (STA) such as STA1 100-1 that may successfully sync with each other to communicate with each other and is not the concept to indicate a particular area. The BSS 105 may include one AP 130 and one or more STAs 105-1 and 105-2 connectable to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 230 connected via the distribution system 110. The APs included in one ESS 140 may have the same service set identification (SSID).

The portal 120 may function as a bridge that performs connection of the WLAN network (IEEE 802.11) with other network (for example, 802.X).

In the infrastructure network as shown in the upper portion of FIG. 1, a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent basic service set (BSS).

A lower portion of FIG. 1 is a concept view illustrating an independent BSS.

Referring to the lower portion of FIG. 1, the independent BSS (IBSS) is a BSS operating in ad-hoc mode. The IBSS does not include an AP, so that it lacks a centralized management entity. In other words, in the IBSS, the STAs 150-1, 150-2, 150-3, 155-1, and 155-2 are managed in a distributed manner. In the IBSS, all of the STAs 150-1, 150-2, 150-3, 155-1, and 155-2 may be mobile STAs, and access to the distribution system is not allowed so that the IBSS forms a self-contained network.

The STA is some functional medium that includes a medium access control (MAC) following the Institute of Electrical and Electronics Engineers (IEEE) 802.11 standards and that includes a physical layer interface for radio media, and the term "STA" may, in its definition, include both an AP and a non-AP station (STA).

The STA may be referred to by various terms such as mobile terminal, wireless device, wireless transmit/receive unit (WTRU), user equipment (UE), mobile station (MS), mobile subscriber unit, or simply referred to as a user.

An access point (AP) operating in a wireless local area network (WLAN) system may transmit data to each of a plurality of stations (STAs) through the same time resource. If a transmission from an AP to an STA is referred to as a downlink transmission, a transmission from such AP to each of a plurality of STAs may be expressed by using the term downlink multi-user (DL MU) transmission (or downlink multiple user transmission).

Hereinafter, a radio access method that is used in 802.11 is disclosed.

A MAC layer may use a distributed coordination function (DCF) as a method for allowing a plurality of STAs to share a radio medium. The DCF may correspond to a channel access method based on carrier sensing multiple access with collision avoidance (CSMA/CA). More specifically, the channel access based on DCF is as described below.

FIG. 2 is a conceptual drawing showing a channel access procedure based on DCF.

In the DCF-based channel access procedure, if the medium is not in a used state during DIFS duration or more (i.e., in case the medium is idle), the STA may transmit a frame (or MAC protocol data unit (MPDU)) for which transmission is imminent. In case the medium is determined to be in a used state by a carrier sensing mechanism, the STA may determine the size of a contention window (CW) by a random backoff algorithm and may then perform a backoff procedure. In order to perform the backoff procedure, the STA may configure the CW, and, then, a random integer (or backoff count) within the CW may be selected by the STA. A backoff time may be configured based on a backoff count and a timeslot. The backoff time may be decreased (or decremented) in case the medium is idle. More specifically, the STA may determine whether or not the channel is in an idle state during a DIFS, and, in case the channel is idle (or in an idle state) during a DIFS, the STA may decrease (or decrement) the backoff time.

The STA being the first to have its backoff time decremented to 0 may perform channel access. The remaining STAs may stop the decrementation in the remaining backoff time until the end of the medium occupancy of the STA transmitting a frame by performing channel access. After the end of the medium occupancy of the STA that has performed channel access, the remaining STAs may once again perform contention based on the remaining backoff time so as to gain channel access authority. Such channel access method that is based on the DCF performs a function of preventing collision, which occurs due to simultaneous transmission of multiple STAs, thereby avoiding collision.

The backoff time may be defined as shown below in the following equation.

$$\text{Backoff time} = \text{Random}(\ ) \times \text{aSlotTime} \qquad \text{<Equation 1>}$$

Random may correspond to a value (or backoff count) that is selected between [0, CW]. Contention window (CW) may correspond to a value between CWmin and CWmax. CWmin and CWmax may be determined in accordance with characteristics of the physical layer (PHY characteristics). CWmin may correspond to a minimum value that may be selected as the CW, and CWmax may correspond to a maximum value that may be selected as the CW. Each of CWmin and the CWmax may be differently configured even in accordance with the access category of the transmitted data. For example, CWmin may be initially configured as the CW, and, then, since the size of the CW may increase exponentially, when the frame transmission of the STA is failed, the CW may be increased to up to a maximum value of CWmax.

As a value being determined in accordance with the characteristics of the physical layer, aSlotTime may correspond to a time unit.

Figure 3:
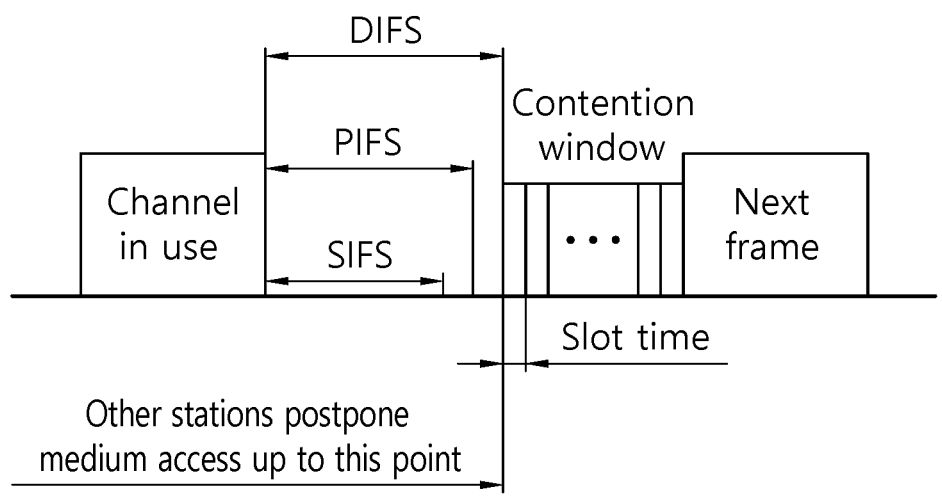
FIG. 3 is a conceptual drawing showing interframe spaces.

FIG. 3 is a conceptual drawing showing interframe spaces.

Referring to FIG. 3, a time interval between two frames being transmitted within a medium may be referred to as an interframe space (IFS). The priority of an STA occupying a wireless medium may be determined based on IFSs having different lengths. The frames being transmitted within the medium may be transmitted based on IFSs having different lengths. For example, different IFSs may be used for the transmission of frames within a medium.

(1) Short inter frame symbol (SIFS): This is used for the transmission of Request to send (RTS) frame/Clear to send (CTS) frame, and acknowledgement (ACK) frame.

(2) PCF IFS (PIFS): This is used for the transmission of a PCF frame (e.g., a channel switch announcement frame, a traffic indication map (TIM) frame, and so on) and the frame transmission of a STA performing channel access based on a point coordination function (PCF).

(3) DCF IFS (DIFS): This is used for the frame transmission of a STA performing channel access based on a DCF.

(4) Extended IFS (EIFS): This is used only when a frame transmission error occurs, and this is not a fixed interval.

Among each of the IFSs, a calculation formula of the SIFS may correspond to Equation 1 to Equation 3, and the values marked inside the parentheses next to each parameter may correspond to general values for each of the parameters. The value of each parameter may vary for each STA. Each equation is disclosed in 9.3.7 DCF timing relation of the IEEE P802.11-REVmc™/D2.0 document, which was disclosed in October 2013, and the parameters used in each equation are disclosed in 6.5.4 PLME-CHARACTERISTICS.confirm of the IEEE P802.11-REVmc™/D2.0 document, 6.5 PLME SAP interface of the IEEE Std 802.11ac™-2013 document, and so on.

SIFS(16 μs)=aRxRFDelay(0.5)+aRxPLCPDelay
  (12.5)+aMACProcessingDelay(1 or <2)+aRxTx-
  TurnaroundTime(<2)

aRxTxTurnaroundTime=aTxPLCPDelay(1)+aRxTx-
  SwitchTime(0.25)+aTxRampOn Time(0.25)+
  aTxRFDelay(0.5)                                  <Equation 1>

Referring to Equation 1, the SIFS may correspond to a value that is based on a radio frequency (RF) end delay, a delay of a physical layer convergence protocol (PLCP) end, a medium access control (MAC) processing delay, and a transition time from Rx to Tx. For example, the SIFS may correspond to a time period starting from a time point when a last symbol of a receiving frame is received from the medium (or air interface) and up to a time point when a first symbol of a transmitting frame is transmitted to the medium (or air interface).

PIFS(25 μs)=aSIFSTime+aSlotTime aSlotTime=aCCATime(<4)+aRxTxTurnaroundTime
  (<2)+aAirPropagationTime(<1)+aMACPro-
  cessingDelay(<2)                                 <Equation 2>

Herein, aAirProgationTime may be two times the size of the propagation time (or propagation delay) for signal transmission within a maximum interval between slot-synchronized STAs located at furthermost distances within a communication range. Herein, aAirProgationTime may correspond to a value equal to or less than 1 μs. A radio wave may be propagated at 300 m/μs.

Distributed (coordination function) interframe space
  (DIFS) (34 μs)=aSIFSTime+2×aSlotTime            <Equation 3>

Referring to Equation 1 to Equation 3, values of the SIFS, PIFS, and DIFS may vary in accordance with the capability of the STA and/or the wireless communication environment. For example, in accordance with the capability of the STA and/or the wireless communication environment, the SIFS may have a maximum value of 16 μs, and the PIFS may have a value ranging from a minimum value of 16 μs to a maximum value of 25 μs.

In the legacy wireless LAN system, the AP was capable of performing DL MU transmission based on multiple input multiple output (MU MIMO), and such transmission may be expressed by using the term DL MU MIMO transmission. In the exemplary embodiment of the present invention, the AP may perform DL MU transmission based on an orthogonal frequency division multiplexing access (OFDMA), and such transmission may be expressed by using the term DL MU OFDMA transmission. In case the DL MU OFDMA transmission is used, the AP may transmit downlink data (or downlink frames) to each of the multiple STAs through each of the multiple frequency resources within an overlapping time resource.

Each of the PPDU, frame, and data that are transmitted via downlink transmission may be respectively expressed by using the terms downlink PPDU, downlink frame, and downlink data. The PPDU may correspond to a data unit including a PPDU header and a physical layer service data unit (PSDU) (or MAC protocol data unit (MPDU)). The PPDU header may include a PHY header and a PHY preamble, and the PSDU (or MPDU) may include a frame or may indicate a frame.

A DL single user (SU) transmission may indicate a downlink transmission from the AP to one STA within the entire transmission resource.

Conversely, a transmission from an STA to the AP may be referred to as an uplink transmission, and the transmission of data from multiple STAs to the AP within the same time resource may be expressed by using the term uplink multi-user transmission (or uplink multiple user transmission). Unlike the legacy wireless LAN system, in the wireless LAN system according to the exemplary embodiment of the present invention, the UL MU transmission may be supported. Each of the PPDU, frame, and data that are transmitted via uplink transmission may be respectively expressed by using the terms uplink PPDU, uplink frame, and uplink data. The uplink transmission that is performed by each of the multiple STAs may be performed within a frequency domain or a spatial domain.

In case the uplink transmission that is performed by each of the multiple STAs is performed within the frequency domain, different frequency resources respective to each of the multiple STAs may be allocated as uplink transmission resources based on orthogonal frequency division multiplexing access (OFDMA). Each of the multiple STAs may transmit an uplink frame to the AP by using the respective frequency resources allocated to each STA. Such transmission method using different frequency resources may also be expressed by using the term UL MU OFDMA transmission method.

In case the uplink transmission that is performed by each of the multiple STAs is performed within the spatial domain, different space time streams (or spatial streams) are allocated to each of the multiple STAs, and each of the multiple STAs may transmit an uplink frame to the AP by using different space time streams. Such as transmission method using different spatial streams may also be expressed by using the term UL MU MIMO transmission method.

The UL SU transmission may indicate a downlink transmission from one STA to one AP within the entire transmission resource.

Hereinafter, in the exemplary embodiment of the present invention, a method, wherein multiple STAs receive uplink transmission trigger frames (or trigger frames) triggering uplink transmission from the AP, and wherein each of the multiple STAs transmits an uplink frame to the AP via UL MU transmission based on the uplink transmission trigger frame, will be disclosed. The multiple STAs receiving indication to perform UL MU transmission based on the uplink transmission trigger frame may be expressed by using the term UL MU target STA.

After the transmission of the uplink transmission trigger frame, which is performed by the AP, each of the UL MU target STAs may transmit an uplink frame to the AP based on the UL MU transmission method, before any attempt to perform contention for the channel access of other STAs apart from the UL MU target STAs. For example, in order to limit channel access of other STAs excluding the UL MU target STAs, an interframe space between the uplink transmission trigger frame and the uplink frame of the UL MU target STA may be configured to have a size that does not tolerate channel access from any other STA. Additionally, a TXOP for UL MU transmission may be configured based on the uplink transmission trigger frame.

Figure 4:
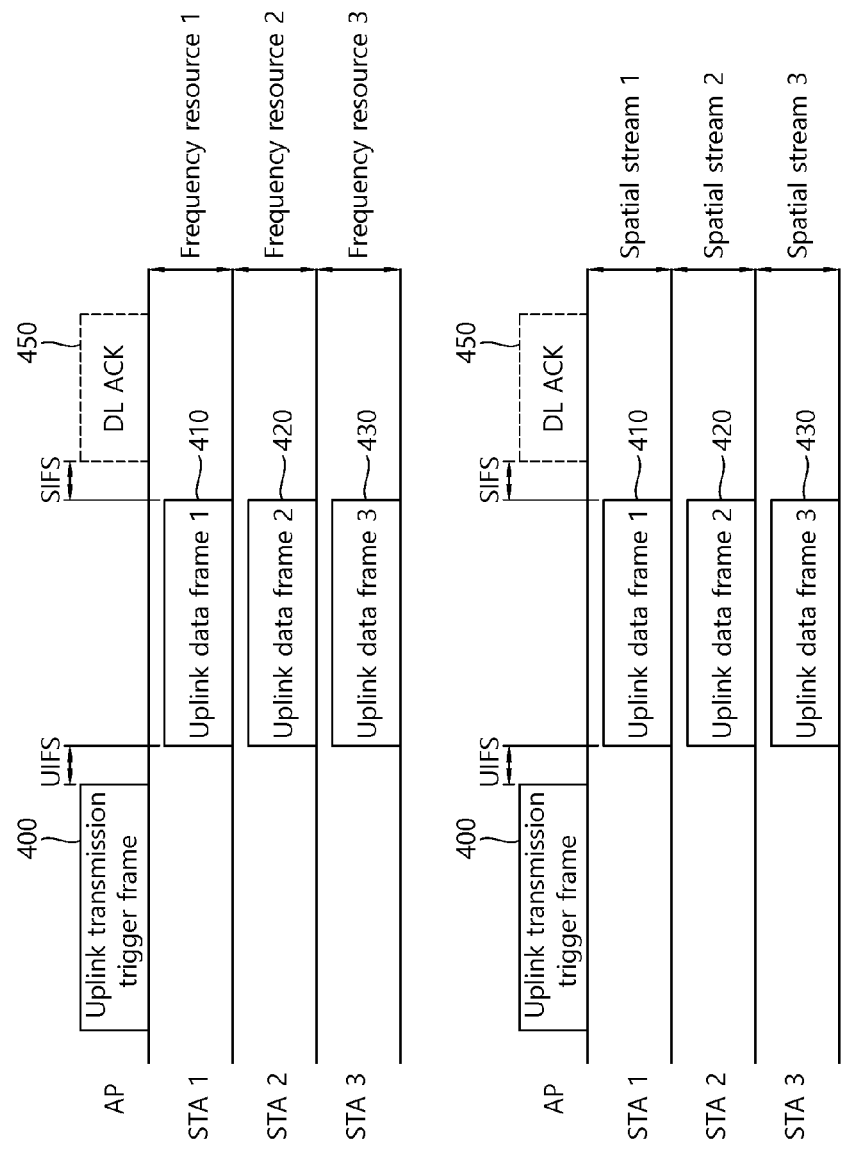
FIG. 4 is a conceptual view showing a UL MU transmission based on an uplink transmission trigger frame according to an exemplary embodiment of the present invention.

FIG. 4 is a conceptual view showing a UL MU transmission based on an uplink transmission trigger frame according to an exemplary embodiment of the present invention.

Referring to FIG. 4, each of the plurality of UL MU target STAs (e.g., STA1, STA2, and STA3) may perform uplink transmission based on an uplink transmission trigger frame 400 (or scheduling frame), which is transmitted by the AP. Each of the plurality of UL MU target STAs may receive the uplink transmission trigger frame 400 from the AP and, then, after a predetermined interframe space (e.g., uplink interframe space (UIFS)), each of the plurality of UL MU target STAs may transmit an uplink data frame 410, 420, and 430 to the AP. The uplink transmission, which is performed by each of the plurality of UL MU STAs, may be performed within an overlapping time resource through each of the plurality of frequency resource or each of the plurality of spatial resources.

The uplink transmission trigger frame 400 may include information for the uplink transmission of the plurality of UL MU target STAs. For example, the uplink transmission trigger frame 400 may include information indicating each of the plurality of UL MU target STAs or a group of the plurality of UL MU target STAs performing the uplink transmission, modulation and coding scheme (MCS) information that is to be used for the transmission of uplink data by each of the plurality of UL MU target STAs, information on an uplink data capacity (or size) that can be transmitted by each of the plurality of UL MU target STAs, and information on a transmission opportunity (TXOP) for uplink transmission (UL MU TXOP). TXOP may indicate a time resource for the transmission of a frame.

The capacity (or size) of uplink data transmitted by each of the plurality of UL MU target STAs and/or a MCS index for the transmission of uplink data that are to be transmitted by the plurality of UL MU target STAs may be different from one another. Therefore, in case the plurality of STAs transmit only valid (or meaningful) uplink data through uplink data frames 410, 420, and 430, a transmission duration of each of the uplink data frames 410, 420, and 430, which are transmitted by the plurality of STAs, may differ from one another. Therefore, zero padding may be performed for identical configuration of the transmission durations of the uplink data frames 410, 420, and 430, which are respectively transmitted by each of the plurality of STAs, based on the UL MU transmission method. The AP may receive uplink data frames 410, 420, and 430 from each of the plurality of UL MU target STAs based on UL MU transmission within an overlapping time resource, and, as a response to the plurality of uplink data frames 410, 420, and 430, a block ACK frame (or ACK frame) 450 may be transmitted to the plurality of UL MU target STAs.

Alternatively, in case the plurality of STAs transmit uplink data frames 410, 420, and 430 through different frequency resources based on OFDMA in order to enhance the degree of freedom, the transmission duration of the uplink data frames 410, 420, and 430, which are transmitted by each of the plurality of STAs, may each be configured differently. In this case, the AP may transmit a downlink ACK frame to each of the STAs after a short interframe space (SIFS), while individually considering the transmission timing respective to each of the plurality of uplink data frame 410, 420, and 430.

The AP may transmit an uplink transmission trigger frame 400 by performing channel access based on a conventionally defined channel access method (e.g., enhanced distributed channel access (EDCA), distributed coordination function (DCF), and so on), or the AP may transmit an uplink transmission trigger frame 400 based on a newly defined channel access method.

In order to determine the UL MU target STA that is to receive the uplink transmission trigger frame 400, the AP is required to collect buffer status information from the plurality of STAs within a BSS. The buffer status information may correspond to information for determining a UL MU target STA among a plurality of STAs within the BSS and/or a TXOP for the UL MU transmission (UL MU TXOP). The buffer status information may include information related to the transmission of uplink data pending to the STA within the BSS. For example, the buffer status information may include queue size information, access category (AC) information, backoff count information, MCS information, and so on.

More specifically, the queue size information may include information on the size of the data pending to the STA. The AC information may include information on an access category of uplink data that are to be transmitted by the STA via uplink. The backoff count information may include information on a backoff count value of an STA performing channel access for transmitting the pending uplink data to the AP based on UL SU. The MCS information may include MCS index information that is to be used for the transmission of the pending uplink data.

The AP may determine the UL MU target STA based on the buffer status information, and, then, the AP may transmit the uplink transmission trigger frame 400 to the UL MU target STA. In case the AP determines the UL MU target STA based on the buffer status information, an STA requiring preferential UL MU transmission may be preferentially determined as the UL MU target STA, thereby enhancing transmission efficiency in the wireless LAN.

Hereinafter, the exemplary embodiment of the present invention discloses settings of a contention window (CW), a retransmission count, and a backoff count for each of the AP and the STA in accordance with the success or failure of a UL MU transmission. The success of a UL MU transmission may denote the success of a transmission of an uplink transmission trigger frame (or scheduling frame) and the success of a transmission of an uplink frame within a UL TXOP of a UL MU target STA. In other words, the success of a UL MU transmission may mean the success of a transmission of an uplink frame within the UL TXOP of all UL MU targets STAs that are indicated based on the uplink transmission trigger frame. Conversely, the failure of a UL MU transmission may denote a failure in the transmission of an uplink frame within a UL TXOP of at least one UL MU target STA among all of the UL MU target STA that are indicated based on the uplink transmission trigger frame.

More specifically, for the UL MU target STA, the success of the UL MU transmission may denote a success in the reception of an uplink transmission trigger frame from the AP and a success in the transmission of an uplink frame to the AP as a response to the received uplink transmission trigger frame. For the AP, the success of a UL MU transmission may denote a success in the transmission of an uplink transmission trigger frame to multiple UL MU target STAs that are indicated based on the uplink transmission trigger frame and a success in the reception of an uplink frame from each of the multiple UL MU target STAs that are indicated based on the uplink transmission trigger frame. In case the AP has transmitted a BA frame (or ACK frame) respective to the uplink frame received from each of the UL MU target STAs, the AP may determine that the UL MU transmission is successful without considering the successful reception of an ACK frame by the STA.

Figure 5:
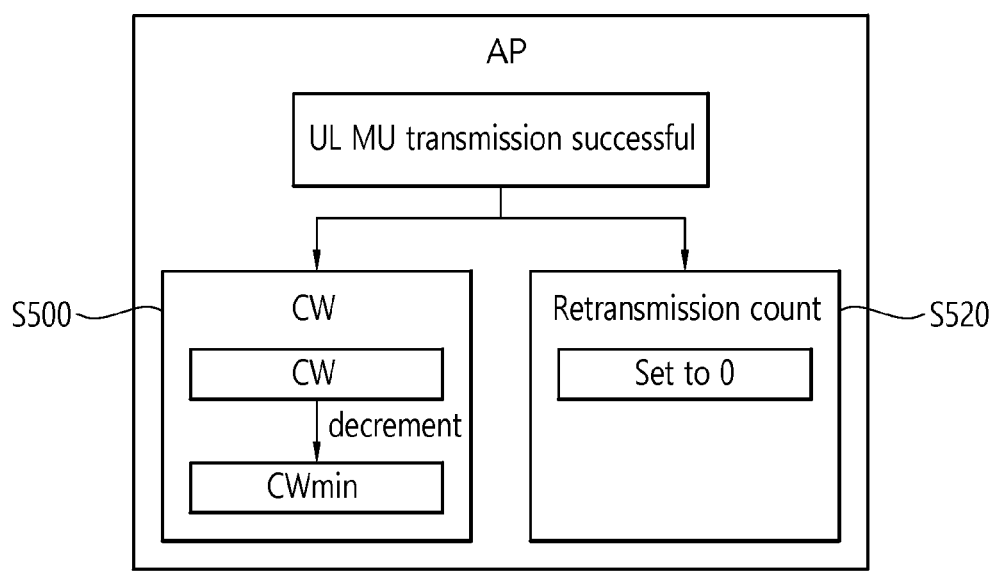
FIG. 5 is a conceptual drawing showing operations of an AP when the UL MU transmission according to the exemplary embodiment of the present invention is successful.

FIG. 5 is a conceptual drawing showing operations of an AP when the UL MU transmission according to the exemplary embodiment of the present invention is successful.

FIG. 5 discloses CW setting and retransmission count setting of the AP in case the UL MU transmission is successful.

Referring to FIG. 5, in case the UL MU transmission is successful, the AP may configure the size of the CW as CWmin (step S500).

The AP may transmit a downlink frame through a backoff procedure before the transmission of an uplink transmission trigger frame. In case the transmission of the downlink frame is failed, the AP may increment the CW. For example, in case the CWmin is set to 7, a backoff procedure may be carried out by selecting a backoff count (or random integer) between [0, 7]. If the backoff time of the AP is decreased (or decremented) to 0, the AP may perform channel access so as to transmit the downlink frame. In case the transmission of the downlink frame by the AP is failed, the AP may transmit a downlink frame based on a primary retransmission procedure. In this case, the retransmission count may be set to 1, and the CW may be incremented from 7 to 15. The retransmission count may indicate a number of retransmissions of the downlink frame by the AP. More specifically, in case the transmission of the downlink frame is failed, the AP may set the CW to 15 and may select a backoff count between [0, 15], so as to carry out the backoff procedure.

By using the above-described method, in case the transmission of the downlink frame by the AP is failed, the size of the CW is incremented, and the retransmission count may also be incremented. The size of the CW may be incremented to up to CWmax. For example, in case the transmission of the downlink frame is failed, the size of the CW may be exponentially incremented (e.g., 7, 15, 31, 63, 127, 255). At this point, 7 may correspond to the value that is set as CWmin, and 255 may correspond to the value that is set as CWmax. In case the retransmission count is incremented to a predetermined threshold number, and in case the retransmission count exceeds the threshold number, the transmission of the downlink frame may be renounced (or the downlink frame may be dropped). If the transmission of the downlink frame by the AP is successful, the CW may be reset (or changed or decremented) to CWmin. Additionally, in case the transmission of the downlink frame is successful, the number of retransmission counts may be reset to 0.

According to the exemplary embodiment of the present invention, in case the AP successfully performs the UL MU transmission, the CW may be reset to CWmin. For example, the CW of the AP for the downlink frame transmission prior to the uplink transmission trigger frame of the AP may already be set. More specifically, the AP may attempt to perform transmission of the downlink frame to the STA prior to the transmission of the uplink transmission trigger frame. In case the AP fails to transmit the downlink frame, the CW of the AP may be set to an incremented value that is incremented by applying the transmission failure of the downlink frame. The AP may transmit the uplink transmission trigger frame prior to the successful transmission of the downlink frame and may then successfully perform UL MU transmission based on the transmission of the uplink transmission trigger frame. In this case, the CW of the AP may be reset to CWmin. When performing transmission of the downlink frame later on, the AP may perform a backoff procedure based on the CWmin. More specifically, the AP may reset the CW based on whether or not the UL MU transmission is successful.

According to another exemplary embodiment of the present invention, in case the UL MU transmission of the AP is successful, the conventionally set CW may be maintained. When performing transmission of the downlink frame later on, the AP may perform a backoff procedure based on the legacy (or conventional) CW, which applies the transmission failure of the downlink frame prior to the UL MU transmission procedure.

The AP may determine the retransmission count of an uplink frame during the UL MU transmission procedure (step S520).

The AP may set the retransmission count based on whether or nor the reception of the uplink frame, which is transmitted by a UL MU target STA, is successful during the UL MU transmission procedure. According to the exemplary embodiment of the present invention, the AP may manage the retransmission count in UL MU target STA group units (or UL MU transmission procedure units). In other words, the AP may have only one retransmission count. The UL MU target STA group may include a plurality of UL MU target STAs that have received indication to perform transmission of an uplink frame by the uplink transmission trigger frame.

For example, a case when the UL MU target STA group includes 4 UL MU target STAs may be assumed. In case the reception of an uplink frame from each of the 4 UL MU target STAs included in the UL MU target STA group is successful, the retransmission count may not be incremented. Conversely, in case the reception of the uplink frame from at least one of the 4 UL MU target STAs included in the UL MU target STA group fails to be successful, the retransmission count may be incremented. More specifically, in case the reception of the uplink frame from at least one UL MU target STA included in the UL MU target STA group is failed, the retransmission count may be incremented.

According to another exemplary embodiment of the present invention, the AP may manage the retransmission count corresponding to each of the UL MU target STAs (or each uplink frame being transmitted by each of the UL MU target STAs) being included in the UL MU target STA group. In other words, the AP may have a retransmission count corresponding to each of the UL MU target STAs or corresponding to the uplink frame being transmitted by each of the UL MU target STAs.

As shown in FIG. 5, in case the UL MU transmission procedure is successful (in case the AP has successfully performed reception of an uplink frame from each of the plurality of UL MU target STAs being included in the UL MU target STA group), the retransmission count of the AP may be set to 0.

According to another exemplary embodiment of the present invention, the AP may not separately manage the retransmission count for the UL MU transmission. More specifically, the AP may not consider the success or failure in the UL MU transmission procedure for setting (or configuring) the retransmission count.

Figure 6:
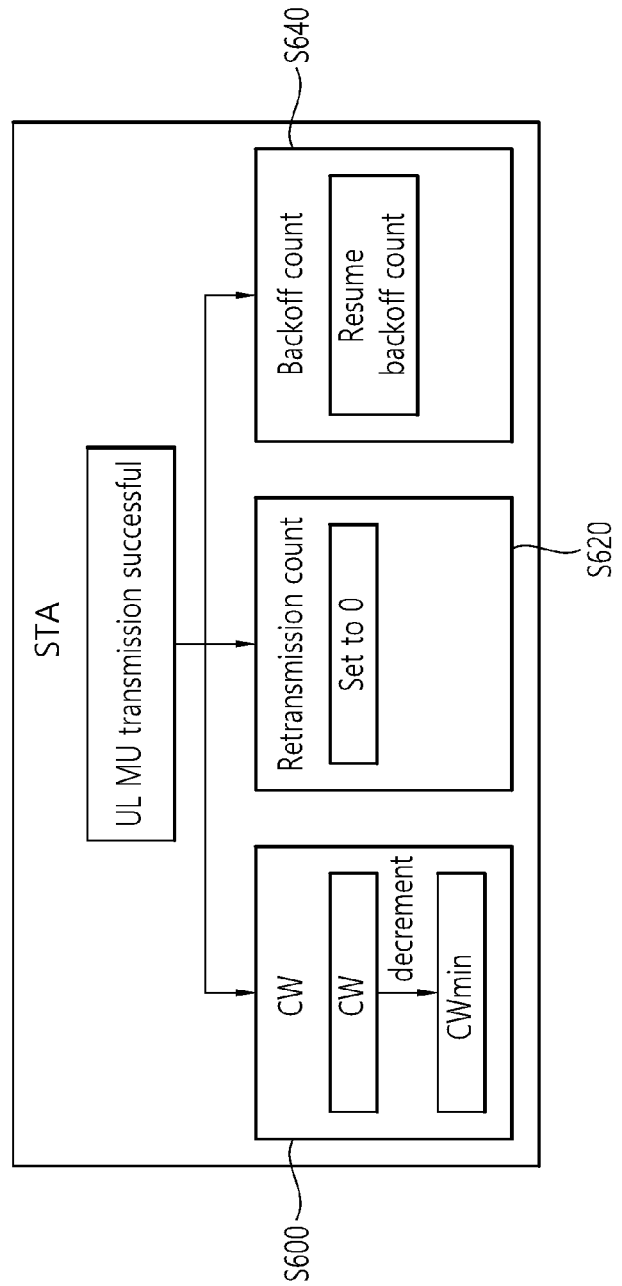
FIG. 6 is a conceptual drawing showing operations of a STA when the UL MU transmission according to the exemplary embodiment of the present invention is successful.

FIG. 6 is a conceptual drawing showing operations of a STA when the UL MU transmission according to the exemplary embodiment of the present invention is successful.

In case the UL MU transmission procedure is successful, FIG. 6 discloses CW setting, retransmission count setting, and backoff count setting of the STA.

Referring to FIG. 6, in case the UL MU transmission is successful, the STA may configure the size of the CW as CWmin (step S600).

The STA may transmit an uplink frame based on a UL SU transmission through a backoff procedure before the transmission of an uplink frame, which is triggered by the uplink transmission trigger frame. In case the transmission of the uplink frame, which is transmitted based on the UL SU transmission, is failed, the STA may increment the CW.

For example, in case the CWmin is set to 7, a backoff procedure may be carried out by selecting a backoff count (or random integer) between [0, 7]. If the backoff time of the STA is decreased (or decremented) to 0, the STA may perform channel access so as to transmit the uplink frame based on the UL SU transmission. In case the transmission of the uplink frame based on UL SU by the STA is failed, the STA may transmit an uplink frame based on a primary retransmission procedure. In this case, the retransmission count may be set to 1, and the CW may be incremented from 7 to 15. The retransmission count may indicate a number of retransmissions of the uplink frame by the STA. More specifically, in case the transmission of the uplink frame is failed, the STA may set the CW to 15 and may select a backoff count between [0, 15], so as to carry out the backoff procedure. By using the above-described method, in case the transmission of the uplink frame based on UL SU by the STA is failed, the size of the CW is incremented, and the retransmission count may also be incremented.

The size of the CW may be incremented to up to CWmax. For example, in case the transmission of the uplink frame is failed, the size of the CW may be exponentially incremented (e.g., 7, 15, 31, 63, 127, 255). At this point, 7 may correspond to the value that is set as CWmin, and 255 may correspond to the value that is set as CWmax. In case the retransmission count is incremented to a predetermined threshold number, and in case the retransmission count exceeds the threshold number, the transmission of the uplink frame may be renounced. If the transmission of the uplink frame by the STA is successful, the CW may be reset (or changed or decremented) to CWmin. Additionally, in case the transmission of the uplink frame is successful, the number of retransmission counts may be reset to 0.

According to the exemplary embodiment of the present invention, even in case the transmission of an uplink frame being triggered based on the uplink transmission trigger frame (hereinafter referred to as a triggered uplink frame) is successful, the UL MU target STA may reset the size of the CW to CWmin. For example, the CW for the transmission of the uplink frame prior to the transmission of the triggered uplink frame by the UL MU target STA may already be set.

More specifically, the STA may be determined as the UL MU target STA and may then attempt to perform UL SU transmission of the uplink frame to the AP prior to the transmission of the triggered uplink frame. In case the STA fails to perform UL SU transmission of the uplink frame, the CW of the STA may be set to an incremented value that is incremented by applying the transmission failure of the uplink frame. Prior to the successful transmission of the uplink frame, the STA may be determined as the UL MU STA based on the uplink transmission trigger frame. The STA that is determined as the UL MU STA may successfully transmit the triggered uplink frame based on the UL MU transmission.

In this case, the CW of the STA that has successfully performed the UL MU transmission may be reset to CWmin. More specifically, when performing a backoff procedure for the UL SU transmission of the uplink frame that will be performed later on, the STA may perform the backoff procedure based on the CWmin. More specifically, the STA may reset the CW based on whether or not the UL MU transmission is successful.

According to another exemplary embodiment of the present invention, the STA that has successfully performed the UL MU transmission may maintain the conventionally set CW. The transmission of the triggered uplink frame may correspond to a triggered uplink transmission and not an uplink transmission through a contention-based channel access. Therefore, when transmitting an uplink frame based on the UL SU transmission later on, the STA that has successfully performed the UL MU transmission may perform a backoff procedure based on the legacy (or conventional) CW, which applies the transmission failure of the conventional uplink frame.

According to the exemplary embodiment of the present invention, the UL MU target STA may determine the retransmission count of an uplink frame during the UL MU transmission procedure (step S620).

The UL MU target STA may set the retransmission count based on whether or not the transmission of an uplink frame is successful during the UL MU transmission procedure. In case of receiving a BA frame (or ACK frame) corresponding to the uplink frame, the UL MU target STA may determine the transmission of the uplink frame as being failed. As shown in FIG. 6, in case the UL MU transmission is successful, the retransmission count of the UL MU target STA may be set to 0. According to another exemplary embodiment of the present invention, the UL MU target STA may not set up a retransmission count for the uplink frame being transmitted through the UL U transmission procedure. for the According to the exemplary embodiment of the present invention, after performing the UL MU transmission procedure, the STA that has successfully performed the UL MU transmission may resume the decrementation (or decrease) in the conventionally set backoff count (or backoff time) (step S640).

Before being determined as the UL MU target STA (before the UL MU transmission procedure), the STA may perform a backoff procedure for the UL SU transmission of the uplink frame. According to the exemplary embodiment of the present invention, a backoff count that was set up for the backoff procedure immediately before the UL MU transmission procedure and decremented may be used for the UL SU transmission of the uplink frame for the STA after the UL MU transmission procedure. More specifically, the decrementation in the conventionally set backoff count may be resumed.

For example, the STA may perform the backoff procedure for the UL SU transmission prior to the transmission of the uplink frame based on the UL MU transmission. the STA may determine the backoff count (or random integer) for the backoff procedure based on the CW. In order to acquire channel access authority for the UL SU transmission of the uplink frame, the STA may decrement the determined backoff count. During the decrementation in the backoff count, the STA may be determined as the UL MU target STA. The STA that is determined as the UL MU target STA may discontinue the decrementation in the backoff count and may transmit a triggered uplink frame, which is triggered by the uplink transmission trigger frame, to the AP. After the ending of the UL MU transmission procedure of the STA, the STA may resume the decrementation in the backoff count, which was discontinued for the transmission of the uplink frame based on the UL SU, and may then acquire the channel access authority.

According to another exemplary embodiment, the STA that has successfully performed the UL MU transmission procedure may disregard the conventionally set backoff count (or backoff time) and may newly select the backoff count. More specifically, before being determined as the UL MU target STA (before the UL MU transmission procedure), the STA may disregard the backoff count, which is decremented during the backoff procedure for the UL SU transmission of the uplink frame, and may then select a new backoff count based on the CW.

Figure 7:
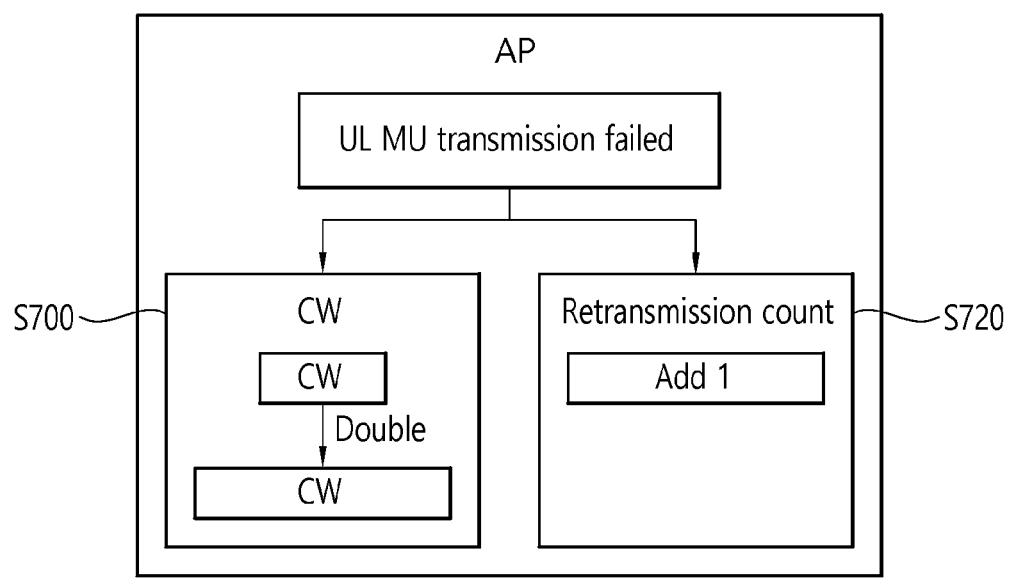
FIG. 7 is a conceptual drawing showing operations of an AP when the UL MU transmission according to the exemplary embodiment of the present invention has failed.

FIG. 7 is a conceptual drawing showing operations of an AP when the UL MU transmission according to the exemplary embodiment of the present invention has failed.

FIG. 7 discloses CW setting and retransmission count setting of the AP in case the UL MU transmission is failed.

Referring to FIG. 7, in case the UL MU transmission is failed, the AP may increment the CW (step S700).

For example, in case the current CW is not the CWmax, the AP may set the CW to two times the current CW, and, in case the current CW is the CWmax, the AP may maintain the CW to the CWmax. More specifically, the failure in the UL MU transmission may denote a failure in the transmission of an uplink frame within the UL TXOP of at least one UL MU target STA among all of the UL MU target STAs that are indicated based on the uplink transmission trigger frame.

The CW of the AP for the downlink frame transmission prior to the uplink transmission trigger frame of the AP may already be set. In case the UL MU transmission procedure is failed, the CW of the AP that was set prior to the transmission of the uplink transmission trigger frame may be incremented.

According to another exemplary embodiment of the present invention, in case the UL MU transmission of the AP is failed, the conventionally set CW may be maintained. More specifically, when performing transmission of the downlink frame after the UL MU transmission procedure, the AP may perform a backoff procedure based on the conventional CW, which applies the transmission failure of the downlink frame, and may then transmit the downlink frame.

The AP may determine the retransmission count of an uplink frame during the UL MU transmission procedure. In case the UL MU transmission procedure is failed, the AP may increment the retransmission count. More specifically, the AP may set the retransmission count based on whether or not the reception of the uplink frame, which is transmitted by a UL MU target STA, is successful during the UL MU transmission procedure.

According to the exemplary embodiment of the present invention, the AP may manage the retransmission count in UL MU target STA group units (or UL MU transmission procedure units). In other words, the AP may have only one retransmission count. More specifically, in case the reception of the uplink frame from at least one UL MU target STA included in the UL MU target STA group is failed, the retransmission count may be incremented. Therefore, the AP may increment the retransmission count, which is managed in UL MU target STA group units.

According to another exemplary embodiment of the present invention, the AP may manage the retransmission count corresponding to each of the UL MU target STAs (or each uplink frame being transmitted by each of the UL MU target STAs) being included in the UL MU target STA group. In other words, the AP may have a retransmission count corresponding to each of the UL MU target STAs or corresponding to the uplink frame being transmitted by each of the UL MU target STAs. A case when 4 UL MU target STAs (UL MU target STA1, UL MU target STA2, UL MU target STA3, and UL MU target STA4) are included in a UL MU target STA group may be assumed. If the reception of the uplink frame from the UL MU target STA3 is failed during the UL MU transmission procedure, the AP may increment the retransmission count for the UL MU STA3.

In case the retransmission count has varied up to the maximum retransmission count that is set, the retransmission count is reset to 0, and the AP may drop the uplink frame (or renounce reception of the uplink frame), which has failed to be transmitted and retransmitted, without triggering the uplink frame.

According to another exemplary embodiment of the present invention, the AP may not separately manage the retransmission count for the UL MU transmission. More specifically, the AP may not consider the success or failure in the UL MU transmission procedure for setting (or configuring) the retransmission count.

Figure 8:
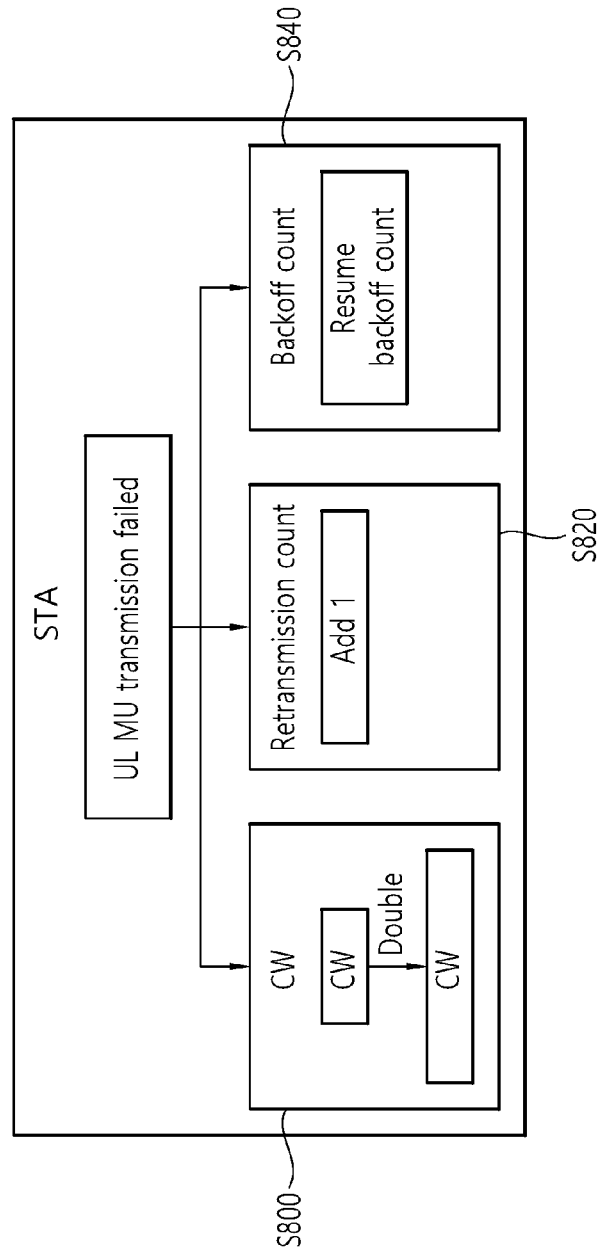
FIG. 8 is a conceptual drawing showing operations of a STA when the UL MU transmission according to the exemplary embodiment of the present invention has failed.

FIG. 8 is a conceptual drawing showing operations of a STA when the UL MU transmission according to the exemplary embodiment of the present invention has failed.

FIG. 8 discloses CW setting and retransmission count setting of the STA in case the UL MU transmission is failed.

Referring to FIG. 8, in case the UL MU transmission is failed, the STA may increment the CW. For example, in case the current CW is not the CWmax, the STA may set the CW to two times the current CW, and, in case the current CW is the CWmax, the AP may maintain the CW to the CWmax. More specifically, the failure in the UL MU transmission may denote a failure in the transmission of a triggered uplink frame based on the uplink transmission trigger frame.

Before the STA is determined as a UL MU target STA based on the uplink transmission trigger frame, the CW of the STA for the uplink transmission may already be set. In case the UL MU transmission procedure is failed, the STA may increment the CW that was set prior to the reception of the uplink transmission trigger frame.

According to another exemplary embodiment of the present invention, in case the UL MU transmission is failed, the conventionally set CW may be maintained. The STA may transmit the uplink frame after the UL MU transmission procedure based on the UL SU transmission. In this case, the STA may perform a backoff procedure based on the conventional CW, which applies the transmission failure of the uplink frame, and may then transmit the uplink data frame.

In case the UL MU transmission is failed, the STA may determine the retransmission count of the uplink frame during the UL MU transmission procedure. In case the UL MU transmission procedure is failed, the STA may increment the retransmission count. More specifically, the STA may set the retransmission count based on whether or not the transmission of the uplink frame is successful during the UL MU transmission. In case the STA fails to receive a BA frame (or ACK frame) for the uplink frame, which is transmitted based on the UL MU transmission, this may be determined as a failure in the UL MU transmission of the uplink frame (or failure in the UL MU transmission). In case the retransmission count has varied up to the maximum retransmission count that is set, the retransmission count is reset to 0, and the AP may drop the uplink frame (or renounce reception of the uplink frame), which has failed to be transmitted and retransmitted, without triggering the uplink frame.

According to another exemplary embodiment of the present invention, the AP may not separately manage the retransmission count for the UL MU transmission. More specifically, the AP may not consider the success or failure in the UL MU transmission procedure for setting (or configuring) the retransmission count.

According to the exemplary embodiment of the present invention, after performing the UL MU transmission procedure, the STA that has failed to perform the UL MU transmission may resume the decrementation (or decrease) in the conventionally set backoff count (or backoff time). Before being determined as the UL MU target STA (before the UL MU transmission procedure), the STA may perform a backoff procedure for the UL SU transmission of the uplink frame. According to the exemplary embodiment of the present invention, a backoff count that was set up for the backoff procedure immediately before the UL MU transmission procedure may be used for the UL SU transmission of the uplink frame for the STA after the UL MU transmission procedure. More specifically, the decrementation in the conventionally set backoff count may be resumed.

For example, the STA may perform the backoff procedure for the UL SU transmission prior to the transmission of the uplink frame based on the UL MU transmission. the STA may determine the backoff count (or random integer) for the backoff procedure based on the CW. In order to acquire channel access authority for the UL SU transmission of the uplink frame, the STA may decrement the backoff count. During the decrementation in the backoff count, the STA may be determined as the UL MU target STA. The STA that is determined as the UL MU target STA may discontinue the decrementation in the backoff count and may transmit a triggered uplink frame, which is triggered by the uplink transmission trigger frame. After the ending of the operations of the STA as the UL MU target STA, the STA may resume the decrementation in the backoff count, which was discontinued for the transmission of the uplink frame based on the UL SU, and may then acquire the channel access authority.

According to another exemplary embodiment, the STA that has failed to perform the UL MU transmission procedure may disregard the conventionally set backoff count (or backoff time) and may newly select the backoff count. More specifically, before being determined as the UL MU target STA (before the UL MU transmission procedure), the STA may disregard the backoff count, which is decremented during the backoff procedure for the UL SU transmission of the uplink frame, and may then select a new backoff count based on the CW.

According to the exemplary embodiment of the present invention, in case the decremented backoff count is disregarded and a new backoff count is selected based on the CW, the new backoff count may be selected between the decremented backoff count (or current backoff count) and the CW. The CW may be determined by the above-described CW setup procedure of the STA. More specifically, the new backoff count may correspond to a random integer that is included in the [decremented backoff count, CW] range. In case such method for determining a new backoff count is used, the channel access of the STA that had a relatively small decremented backoff count before the UL MU transmission may be stochastically faster. Additionally, by setting the CW as the maximum size that can be selected as the new backoff count, the STA may transmit an uplink frame after a period of time that is sufficient for the communication status of the medium that has caused the UL MU transmission failure to be changed.

According to another exemplary embodiment of the present invention, by disregarding the conventional decremented backoff count, the STA may select a random integer being included in the [0, CW] range as the backoff count for the UL SU transmission.

Figure 9:
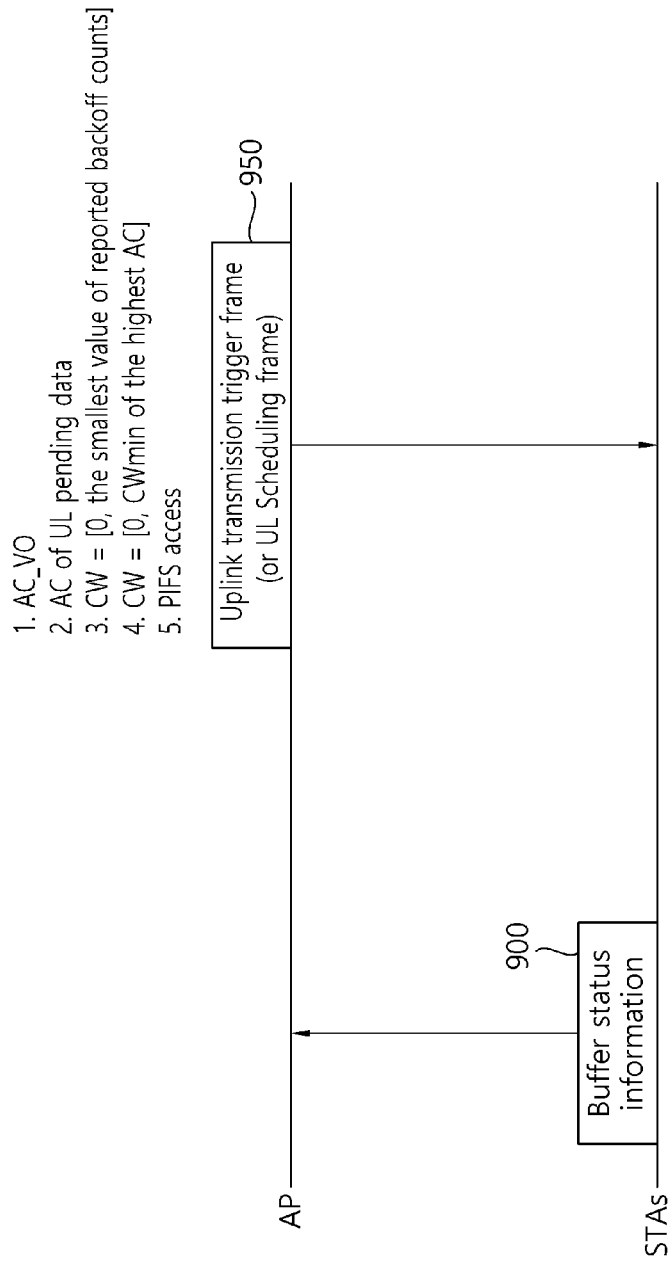
FIG. 9 is a conceptual drawing showing a transmission method of an uplink transmission trigger frame according to an exemplary embodiment of the present invention.

FIG. 9 is a conceptual drawing showing a transmission method of an uplink transmission trigger frame according to an exemplary embodiment of the present invention.

FIG. 9 discloses a transmission method of an uplink transmission trigger frame (or UI scheduling frame) 950 carried out by the AP.

Referring to FIG. 9, the uplink transmission trigger frame 950 may be transmitted based on a contention. An access category of the uplink transmission trigger frame 950 may be configured of an access category_voice (AC_VO). The uplink transmission trigger frame 950 may perform channel access based on a channel access parameter (EDCA parameter) corresponding to the AC_VO. Channel access parameters (CWmin, CWmax, TXOP limit, interframe space (AIFS), and so on) may be differently configured in accordance with the access category.

Alternatively, an access category for the uplink transmission trigger frame 950 may be defined.

Alternatively, the access category of the uplink transmission trigger frame 950 may also be determined based on the access category of the uplink data that are to be transmitted by the UL MU target STA. Multiple STAs within the BSS may transmit buffer status information 900 including information on the access category of pending uplink data, backoff count information, and so on, to the AP. The backoff count information may include information on a backoff count that is selected during the backoff procedure for the UL SU transmission of the pending uplink data of the STA.

The AP may determine the UL MU target STA among the multiple STAs based on the buffer status information 900, and, then, based on the information on the access category of the uplink data that are to be received from the UL MU target STA, the AP may determine the access category of the uplink transmission trigger frame 950. For example, the access category of the uplink transmission trigger frame 950 may be determined as an access category having the highest priority level among the access categories of uplink data that are to be received from the UL MU target STA.

The CW for the transmission of the uplink transmission trigger frame 950 of the AP may correspond to [0, minimum value among the reported backoff count]. The reported backoff count may correspond to a minimum value among the backoff count included in the buffer status information that is reported (or transmitted) from the UL MU target STA.

Alternatively, the CW for the transmission of the uplink transmission trigger frame 950 of the AP may correspond to [0, CWmin corresponding to an access category having the highest priority level].

The access category having the highest priority level may correspond to an access category having the highest priority level among the access categories of pending uplink data that are reported (or transmitted) from the UL MU target STA. Among the channel access parameters of the access category having the highest priority level, CWmin may correspond to the maximum value of the CW for the transmission of the uplink transmission trigger frame 950 of the AP.

According to another exemplary embodiment of the present invention, the uplink transmission trigger frame 950 may be transmitted by a contention free transmission. The uplink transmission trigger frame 950 may be transmitted through a PIFS based access. In case the medium is idle during a PIFS, the AP may immediately transmit the uplink transmission trigger frame 950 after the PIFS without performing any separate backoff procedure.

Figure 10:
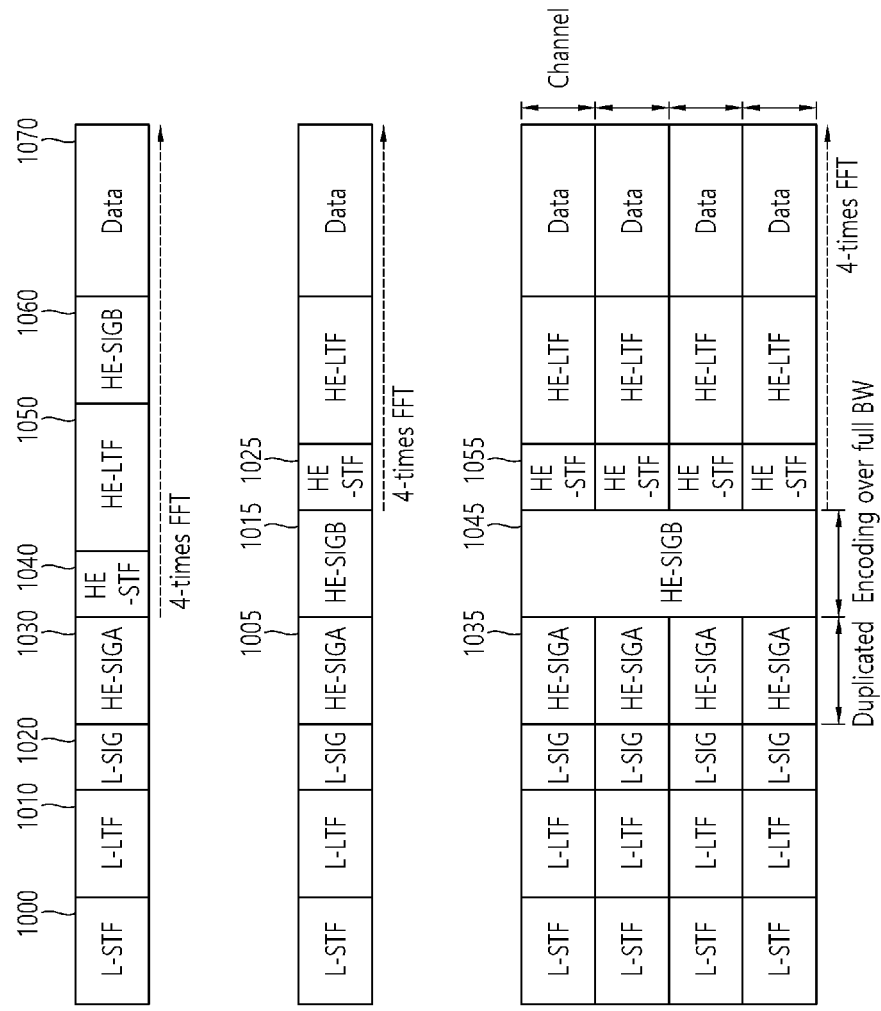
FIG. 10 is a conceptual drawing showing a PPDU format for transmitting a frame according to an exemplary embodiment of the present invention.

FIG. 10 is a conceptual drawing showing a PPDU format for transmitting a frame according to an exemplary embodiment of the present invention.

FIG. 10 discloses a PPDU format according to an exemplary embodiment of the present invention. Based on the PPDU format shown in FIG. 10, the above-described frame transmitting the buffer status information, the uplink transmission trigger frame, the uplink frame (uplink data frame, uplink control frame), the block ACK frame may be carried.

Referring to the upper part of FIG. 10, a PPDU header of a downlink PPDU may include a legacy-short training field (L-STF), a legacy-long training field (L-LTF), a legacy-signal (L-SIG), a high efficiency-signal A (HE-SIG A), a high efficiency-short training field (HE-STF), a high efficiency-long training field (HE-LTF), and a high efficiency-signal B (HE-SIG B). The PPDU may be divided into a legacy part, which consists of a part starting from the PHY header to the L-SIG, and a high efficiency (HE) part, which consists of a part after the L-SIG.

The L-STF 1000 may include a short training orthogonal frequency division multiplexing (OFDM) symbol. The L-STF 1000 may be used for frame detection, automatic gain control (AGC), diversity detection, and coarse frequency/time synchronization.

The L-LTF 1010 may include a long training orthogonal frequency division multiplexing (OFDM) symbol. The L-LTF 1010 may be used for fine frequency/time synchronization and channel prediction.

The L-SIG 1020 may be used for transmitting control information. The L-SIG 1020 may include information on data transmission rate, data length, and so on.

The HE-SIG A 1030 may also include information for indicating a STA (or AP) that is to receive the PPDU. For example, HE-SIG A 1030 may include an identifier of a specific STA that is to receive the PPDU and information for indicating a group of specific STAs. Additionally, in case the PPDU is transmitted based on OFDMA or MIMO, the HE-SIG A 1030 may also include resource allocation information corresponding to the STA.

Additionally, the HE-SIG A 1030 may also include color bits information for BSS identification information, bandwidth information, tail bit, CRC bit, modulation and coding scheme (MCS) information on the HE-SIG B 1060, information on the number of symbols for the HE-SIG B 1060, and cyclic prefix (CP) (or guard interval (GI)) length information.

Additionally, the HE-SIG A 1030 may also include buffer status information (e.g., at least one of queue size information, AC information, backoff count information, and MCS information). Also, the HE-SIG A 1030 may also include scheduling information (UL MU target STA indication information, information on the transmission resource of each UL MU target STA) for the UL MU transmission.

The HE-STF 1040 may be used for enhancing automatic gain control estimation in a multiple input multiple output (MIMO) environment or an OFDMA environment.

The HE-LTF 1050 may be used for estimating a channel in a MIMO environment or an OFDMA environment.

The HE-SIG B 1060 may include information on a length MCS of a physical layer service data unit (PSDU) for each STA and a tail bit, and so on. Additionally, the HE-SIG B 1060 may also include information on the STA that is to receive the PPDU and information on the resource allocation based on OFDMA (or MU-MIMO information). In case the resource allocation information based on OFDMA (or MU-MIMO related information) is included in the HE-SIG B 1060, the corresponding information may not be included in the HE-SIG A 1030.

The IFFT size being applied to the HE-STF 1040 and the field after the HE-STF 1040 may be different from the IFFT size being applied to the field before the HE-STF 1040. For example, the IFFT size being applied to the HE-STF 1040 and the field after the HE-STF 1040 may be four times larger than the IFFT size being applied to the field before the HE-STF 1040. The STA may receive the HE-SIG A 1030 and may receive an indication to receive a downlink PPDU based on the HE-SIG A 1030. In this case, the STA performs decoding based on the FFT size, which is changed starting from the HE-STF 1040 and the field after the HE-STF 1040. Conversely, in case the STA does not receive indication to receive the downlink PPDU based on the HE-SIG A 1030, the STA may stop the decoding process and may perform network allocation vector (NAV) configuration. A cyclic prefix (CP) of the HE-STF 1040 may have a size that is larger than the CP of other fields, and, during such CP period, the STA may change the FFT size and may perform decoding on the downlink PPDU.

The order of the fields configuring the format of the PPDU shown in the upper part of FIG. 10 may also be changed. For example, as shown in the middle part of FIG. 10, the HE-SIG B 1015 may be positioned immediately after the HE-SIG A 1005. The STA may perform decoding up to the HE-SIG A 1005 and the HE-SIG B 1015 and may receive the required control information and may then perform NAV configuration. Similarly, the IFFT size being applied to the HE-STF 1025 and the field after the HE-STF 1025 may be different from the IFFT size being applied to the field before the HE-STF 1025.

The STA may receive the HE-SIG A 1005 and the HE-SIG B 1015. In case the reception of the PPDU is indicated by the HE-SIG A 1005, the STA may change the FFT size starting from the HE-STF 1025 and may then perform decoding on the PPDU. Conversely, the STA may receive the HE-SIG A 1005, and, in case the reception of the downlink PPDU is not indicated based on the HE-SIG A 1005, the network allocation vector (NAV) configuration may be performed.

Referring to the lower part of FIG. 10, a PPDU format for downlink (DL) multi-user (MU) transmission is disclosed. The PPDU may be transmitted to the STA through different transmission resources (frequency resources or spatial streams). Within the PPDU, the fields before the HE-SIG B 1045 may each be transmitted from different transmission resources in duplicated forms. The HE-SIG B 1045 may be transmitted in an encoded form over the entire transmission resources. Alternatively, the HE-SIG B 1045 may be encoded in the same unit (e.g., 20 MHz) as the legacy part and may be duplicated in 20 MHz units within the entire transmission resource and may then be transmitted. Although the HE-SIG B 1045 may be encoded in the same unit (e.g., 20 MHz) as the legacy part, the HE-SIG B 1045 that is being transmitted through each of the multiple 20 MHz units, which are included in the entire transmission resource, may also include different sets of information.

The fields after the HE-SIG B 1045 may include individual information for each of the multiple STAs receiving the PPDU.

In case each of the fields included in the PPDU is transmitted through each transmission resource, the CRC for each field may be included in the PPDU. Conversely, in case a specific field included in the PPDU is encoded and transmitted over the entire transmission resource, the CRC for each field may not be included in the PPDU. Therefore, the overhead for the CRC may be reduced.

Similarly, in the PPDU format for the DL MU transmission, the HE-STF 1055 and the field after the HE-STF 1055 may also be encoded based on an IFFT size that is different from the field before the HE-STF 1055. Therefore, in case the STA receives the HE-SIG A 1035 and the HE-SIG B 1045 and receives an indication on the reception of the PPDU based on the HE-SIG A 1035, the STA may change the FFT size starting from the HE-STF 1055 and may then perform decoding on the PPDU.

Figure 11:
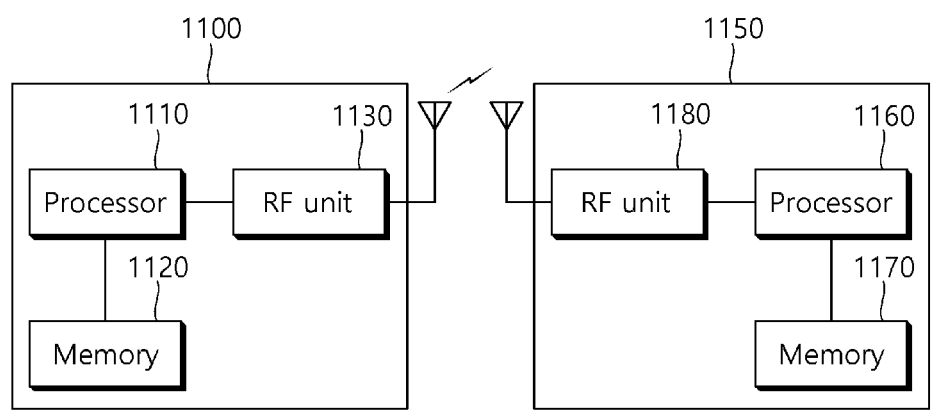
FIG. 11 is a conceptual drawing showing a wireless device to which the exemplary embodiment of the present invention can be applied.

FIG. 11 is a conceptual drawing showing a wireless device to which the exemplary embodiment of the present invention can be applied.

Referring to FIG. 11, as an STA that can implement the above-described exemplary embodiment, the wireless device 1100 may correspond to an AP 1100 or a non-AP station (STA) 1150.

The AP 1100 includes a processor 1110, a memory 1120, and a radio frequency (RF) unit 1130.

The RF unit 1130 is connected to the processor 1110, thereby being capable of transmitting and/or receiving radio signals.

The processor 1110 implements the functions, processes, and/or methods proposed in the present invention. For example, the processor 1110 may be implemented to perform the operations of the AP according to the above-described exemplary embodiments of the present invention. The processor may perform the operations of the AP, which are disclosed in the exemplary embodiments of FIG. 1 to FIG. 10.

For example, the processor 1110 may be configured to transmit an uplink transmission trigger frame and to determine the CW and the retransmission count based on the success or failure of the UL MU transmission.

The STA 1150 includes a processor 1160, a memory 1170, and a radio frequency (RF) unit 1180.

The RF unit 1180 is connected to the processor 1160, thereby being capable of transmitting and/or receiving radio signals.

The processor 1160 implements the functions, processes, and/or methods proposed in the present invention. For example, the processor 1160 may be implemented to perform the operations of the STA according to the above-described exemplary embodiments of the present invention. The processor may perform the operations of the STA, which are disclosed in the exemplary embodiments of FIG. 1 to FIG. 10.

For example, the processor 1160 may be configured to receive an uplink transmission trigger frame from the AP, to transmit an uplink frame to the AP through an allocated uplink transmission resource, and to perform a backoff procedure based on a channel access parameter that is determined in accordance with the success or failure of the transmission of the uplink frame. The uplink transmission trigger frame may trigger a transmission of the uplink frame and a transmission of another uplink frame of at least another STA within an overlapping time resource.

The channel access parameter may include the CW and the backoff count. In case the transmission of the uplink frame is successful, the processor 1160 may set the CW to CWmin and may set the backoff count to the value before discontinuing the decrementation due to the transmission of the uplink frame. Conversely, in case the transmission of the uplink frame is failed, and in case the CW does not correspond to CWmax, the processor 1160 increments the CW to twice its previous size and may set the backoff count to the value before discontinuing the decrementation due to the transmission of the uplink frame. Alternatively, in case the transmission of the uplink frame is failed, the processor 1160 reselects the backoff count based on the CW, wherein the backoff count may be reselected between the value before discontinuing the decrementation due to the transmission of the uplink frame and the CW.

Additionally, in case the transmission of the uplink frame is successful, the processor 1160 may set the retransmission count to 0, and, in case the transmission of the uplink frame is failed, the processor 1160 may increment the retransmission count. The retransmission count may be indicated by a number of retransmissions of the uplink frame.

The processor 1110 and 1160 may include an application-specific integrated circuit (ASIC), another chip set, a logical circuit, a data processing device, and/or a converter converting a baseband signal and a radio signal to and from one another. The memory 1120 and 1170 may include a read-only memory (ROM), a random access memory (RAM), a flash memory, a memory card, a storage medium, and/or another storage device. The RF unit 1130 and 1180 may include one or more antennas transmitting and/or receiving radio signals.

When the exemplary embodiment is implemented as software, the above-described method may be implemented as a module (process, function, and so on) performing the above-described functions. The module may be stored in the memory 1120 and 1170 and may be executed by the processor 1110 and 1160. The memory 1120 and 1170 may be located inside or outside of the processor 1110 and 1160 and may be connected to the processor 1110 and 1160 through a diversity of well-known means.

What is claimed is:

1. A method for transmitting a frame in a wireless local area network (WLAN), the method comprising:
    performing, by a station (STA), a backoff procedure by decrementing a backoff count,
    wherein the backoff count is a value selected between 0 and a contention window (CW) value;
    receiving, by the STA, an uplink transmission trigger frame allocating a plurality of unlink transmission resource for a plurality of user stations from an access point (AP),
    wherein the uplink transmission trigger frame triggers a plurality of uplink transmissions from the plurality of user station within an overlapped time resource, and
    wherein the STA is one of the user stations triggered by the uplink transmission trigger frame;

suspending, by the STA, the backoff procedure when the uplink transmission trigger frame is received,
wherein the decremented backoff count is maintained as a value immediately before the uplink transmission trigger frame is received;
transmitting, by the STA, an uplink frame to the AP through an uplink transmission resource allocated for the STA in response to the uplink transmission trigger frame; and
after transmitting the uplink frame, resuming, by the STA, the backoff procedure in accordance with a success or a failure of a transmission of the uplink frame,
wherein, when the transmission of the uplink frame is successful, the resumed backoff procedure is performed based on the decremented backoff count, and
wherein, when the transmission of the uplink frame fails, the resumed backoff procedure is performed based on the decremented backoff count.

2. The method of claim 1, wherein, when the transmission of the uplink frame is successful, the CW value is set to CWmin.

3. The method of claim 1, wherein, when the transmission of the uplink frame fails and the CW value is not CWmax, the CW value is incremented to two times its size.

4. The method of claim 1, wherein, when in case the transmission of the uplink frame fails and the CW value is not CWmax, the CW value is incremented to two times its size, and
wherein, when the transmission of the uplink frame fails, the backoff count is reselected between the value immediately before the uplink transmission trigger frame is received and the CW value.

5. The method of claim 1, wherein, when the transmission of the uplink frame is successful, the STA sets a retransmission count to 0,
wherein, when the transmission of the uplink frame fails, the STA increments the retransmission count, and
wherein the retransmission count indicates a number of retransmissions of the uplink frame.

6. A station (STA) for transmitting a frame in a wireless local area network (WLAN), the STA comprising:
a radio frequency (RF) unit configured to transmit and/or receive radio signals; and
a processor operatively connected to the RF unit,
wherein the processor is configured to:
perform a backoff procedure by decrementing a backoff count,
wherein the backoff count is a value selected between 0 and a contention window (CW) value,
receive an uplink transmission trigger frame allocating a plurality of uplink transmission resources for a plurality of user stations from an access point (AP),
wherein the uplink transmission trigger frame triggers a plurality of uplink transmissions from the plurality of user stations within an overlapped time resource, and
wherein the STA is one of the user stations triggered by the uplink transmission trigger frame,
suspend the backoff procedure when the uplink transmission trigger frame is received,
wherein the decremented backoff count is maintained as a value immediately before the uplink transmission trigger frame is received,
transmit an uplink frame to the AP through an uplink transmission resource allocated for the STA in response to the uplink transmission trigger frame, and
resume the backoff procedure in accordance with a success or a failure of a transmission of the uplink frame after transmitting the uplink frame,
wherein, when the transmission of the uplink frame is successful, the resumed backoff procedure is performed based on the decremented backoff count, and
wherein, when the transmission of the uplink frame fails, the resumed backoff procedure is performed based on the decremented backoff count.

7. The STA of claim 6, wherein, when the transmission of the uplink frame is successful, the CW value is set to CWmin.

8. The STA of claim 6, wherein, when the transmission of the uplink frame fails and the CW value is not CWmax, the CW value is incremented to two times its size.

9. The STA of claim 6, wherein, when the transmission of the uplink frame fails and the CW value is not CWmax, the CW value is incremented to two times its size, and
wherein, when the transmission of the uplink frame fails, the backoff count is reselected between the value immediately before the uplink transmission trigger frame is received and the CW value.

10. The STA of claim 6, wherein, when the transmission of the uplink frame is successful, the STA sets a retransmission count to 0,
wherein, when the transmission of the uplink frame fails, the STA increments the retransmission count, and
wherein the retransmission count indicates a number of retransmissions of the uplink frame.

* * * * *